United States Patent
Fan

(10) Patent No.: US 11,112,216 B1
(45) Date of Patent: Sep. 7, 2021

(54) MOBILE PHONE HOLDER FOR GUNS

(71) Applicant: Eagle Fan, Chu-Pei (TW)

(72) Inventor: Eagle Fan, Chu-Pei (TW)

( * ) Notice: Subject to any disclaimer, the term of this patent is extended or adjusted under 35 U.S.C. 154(b) by 0 days.

(21) Appl. No.: 16/892,470

(22) Filed: Jun. 4, 2020

(51) Int. Cl.
*F41G 11/00* (2006.01)
*H04M 1/21* (2006.01)

(52) U.S. Cl.
CPC ............... *F41G 11/00* (2013.01); *H04M 1/21* (2013.01)

(58) Field of Classification Search
CPC ..... F41G 1/16; F41G 1/22; F41G 1/28; F41G 1/38; F41G 1/387; F41G 11/00; F41G 11/001; F41G 11/003
USPC .................................... 42/124–128
See application file for complete search history.

(56) References Cited

U.S. PATENT DOCUMENTS

| | | | | |
|---|---|---|---|---|
| 2,061,040 | A * | 11/1936 | Mossberg | F41G 11/006 42/126 |
| 2,073,210 | A * | 3/1937 | Horsrud | F41G 11/003 42/126 |
| 5,414,936 | A * | 5/1995 | Sappington | F41G 1/467 124/87 |
| 6,802,129 | B1 * | 10/2004 | Wirth | F41G 1/467 124/87 |
| 8,024,884 | B2 * | 9/2011 | Holmberg | F41C 27/00 42/124 |
| 8,327,574 | B2 * | 12/2012 | Sandler | F41G 11/003 42/126 |
| 8,438,773 | B2 * | 5/2013 | Carlson | F41G 11/008 42/90 |
| 8,578,647 | B2 * | 11/2013 | Storch | F41C 27/00 42/124 |
| 8,911,162 | B2 * | 12/2014 | Kuehl | F16M 11/2085 396/428 |
| 9,416,914 | B1 * | 8/2016 | Fan | F16M 11/24 |
| 10,837,739 | B2 * | 11/2020 | Ramirez | F41C 27/00 |
| 2017/0142301 | A1 * | 5/2017 | Simmon | F41G 11/00 |
| 2017/0227322 | A1 * | 8/2017 | Franklin | F16M 11/041 |

OTHER PUBLICATIONS

Recoil Staff, New Rail Mounts from Caldwell, Nov. 13, 2015, Recoil, pp. 1-3 (Year: 2015).*

* cited by examiner

*Primary Examiner* — Troy Chambers
*Assistant Examiner* — Benjamin S Gomberg
(74) *Attorney, Agent, or Firm* — Lin & Associates IP, Inc.

(57) ABSTRACT

A mobile phone holder for guns is disclosed, including: a horizontal support unit with a locking component for locking onto a guide rail mounted on a gun; a vertical support unit being arranged on the horizontal support unit and located on an opposite side of the position where the locking component is located; a position adjustment unit disposed on the vertical support unit and able to adjust the position by moving vertically, the position adjustment unit having a first adjustment component and a second adjustment component, the first adjustment component being used to lock the position adjustment unit in place after being moved along the vertical support unit; a clamping unit for clamping a mobile phone, installed on the position adjustment unit and rotatable; the second adjustment component being used to lock the position of the clamping unit after rotation.

7 Claims, 7 Drawing Sheets

MOBILE PHONE HOLDER FOR GUNS

BACKGROUND OF THE INVENTION

1. Field of the Invention

The present invention relates generally to a technical field of mobile phone holders, in particular, to a mobile phone holder to be fixed to guns.

2. The Prior Arts

Certain light weapons, such as rifles or pistols, can be installed with a guide rail 1 (as shown in FIG. 1). The guide rail 1 is also called a fishbone. The guide rail 1 has a row of lateral grooves 11 to facilitate positioning and locking, and is used to install telescopes, sniper lens or other accessories to make the gun more accurate in shooting.

At present, the photography or camera function of the mobile phone is very powerful. Some users hope to use the mobile phone's camera function to record or assist in the use of the gun. However, it is not easy to hold the camera while using the gun. Therefore, it is desirable to design a mobile phone holder that can be mounted on the guide rail 1 to meet the needs of users.

SUMMARY OF THE INVENTION

The primary objective of the present invention is to provide a mobile phone holder for guns, which can be mounted on the guide rail of the gun, like a cantilever holding the mobile phone; the mobile phone enlarges the target on the screen for aiming reference, or using the photography function to record the shooting process for later studying and improvement. The present invention is an innovative and practical design. In addition, regardless of whether the user's dominant hand is the left or right hand, the present invention can be applied by appropriately changing the mounting process.

To achieve the foregoing objectives, the present invention provides a mobile phone holder for guns, including: a horizontal support unit with a locking component for locking onto a guide rail mounted on a gun; a vertical support unit being arranged on the horizontal support unit and located on an opposite side of the position where the locking component is located; a position adjustment unit disposed on the vertical support unit and able to adjust the position by moving vertically, the position adjustment unit having a first adjustment component and a second adjustment component, the first adjustment component being used to lock the position adjustment unit in place after being moved along the vertical support unit; a clamping unit for clamping a mobile phone, the clamping unit being installed on the position adjustment unit and rotatable; the second adjustment component being used to lock the position of the clamping unit after rotation, so that the mobile phone can record or assist firing of the gun.

In the present invention, the locking component includes: a fitting groove located on a partial bottom surface of the horizontal support unit, the fitting groove having a plurality of convex strips and a clamping wall; a clamping piece, located on one side of the horizontal support unit at a position corresponding to the fitting groove and able to move horizontally; a knob, used to lock the clamping piece to the horizontal support unit.

In the present invention, the vertical support unit has a first mounting surface and a second mounting surface positioned in opposite directions, the position adjustment unit is mounted on one of the first mounting surface or the second mounting surface. The mounting on one of the first mounting surface or the second mounting surface is to fit the users having the left or right hand as the dominant hand.

In the present invention, the vertical support unit has two oppositely positioned vertical walls, the vertical wall has a plurality of positioning teeth, the position adjustment unit has a housing and a back plate, the first adjustment component has a first clamping block protruding out of the housing; a second clamping block, provided with the housing and movable; a flip piece, pivotally connected to an extension post of the housing and contacting the second clamping block, the flip piece controls the moving distance of the second clamping block; the first clamping block and the second clamping block can be clamped on the corresponding vertical wall, an inner wall of the second clamping block has convex teeth, able to mesh with the positioning teeth.

In the present invention, the back plate is mounted on the housing and is rotatable but unable to be disengaged from the housing, the back plate is locked with the clamping unit; the second adjustment component has a press piece, the locked state of the back plate and the housing is released when the press piece is pressed down, and the clamping unit and the back plate can be rotated synchronously.

In the present invention, the second adjustment component further includes a positioning ring, protrudingly disposed at the back plate and having a plurality of notches in different directions, the press piece is partially restricted to a space formed by the back plate and the housing after assembly, the press piece can move a distance after being pressed and can automatically return to its original position when there is no external force; the press piece has a latch piece, the back plate cannot be rotated when the latch piece is in the notch; when the press piece is pressed down and the latch piece is released from the notch, the locked state of the back plate and the housing is released, and the clamping unit and the back plate can be rotated.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
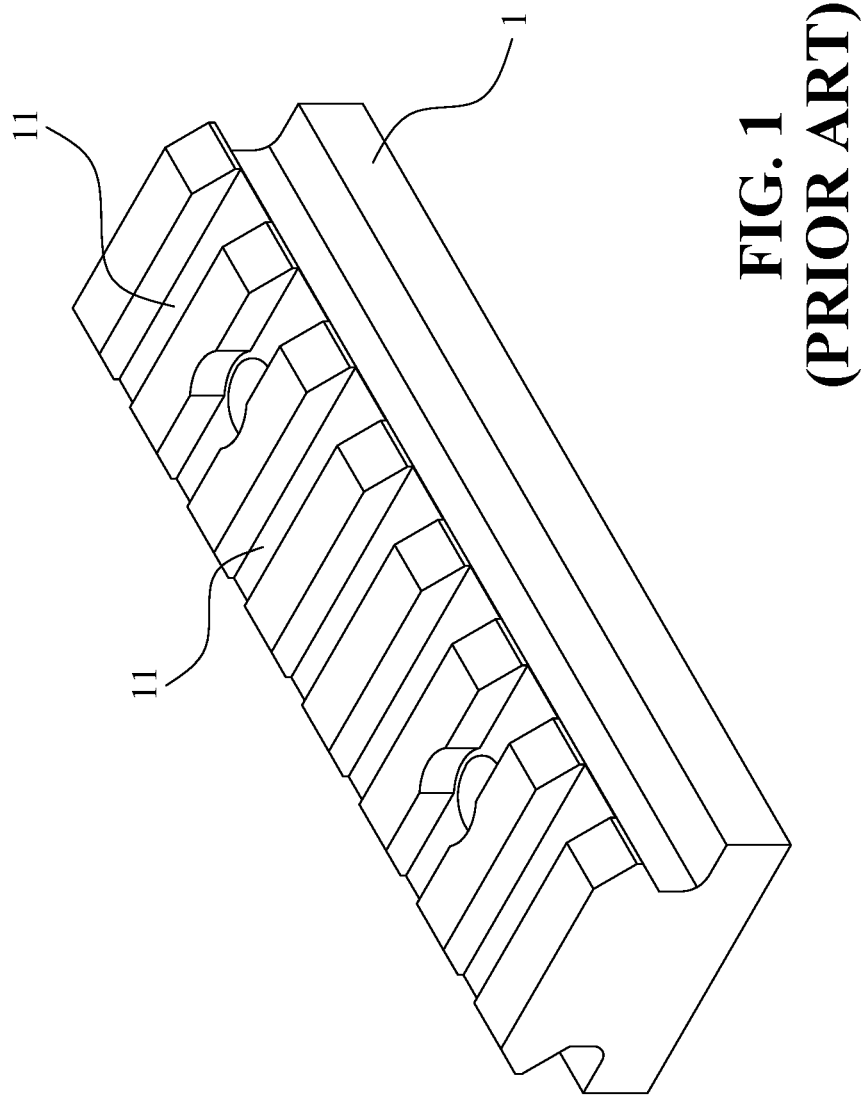
FIG. 1 is a perspective view of one of the guide rails mounted on the gun.
Figure 2:
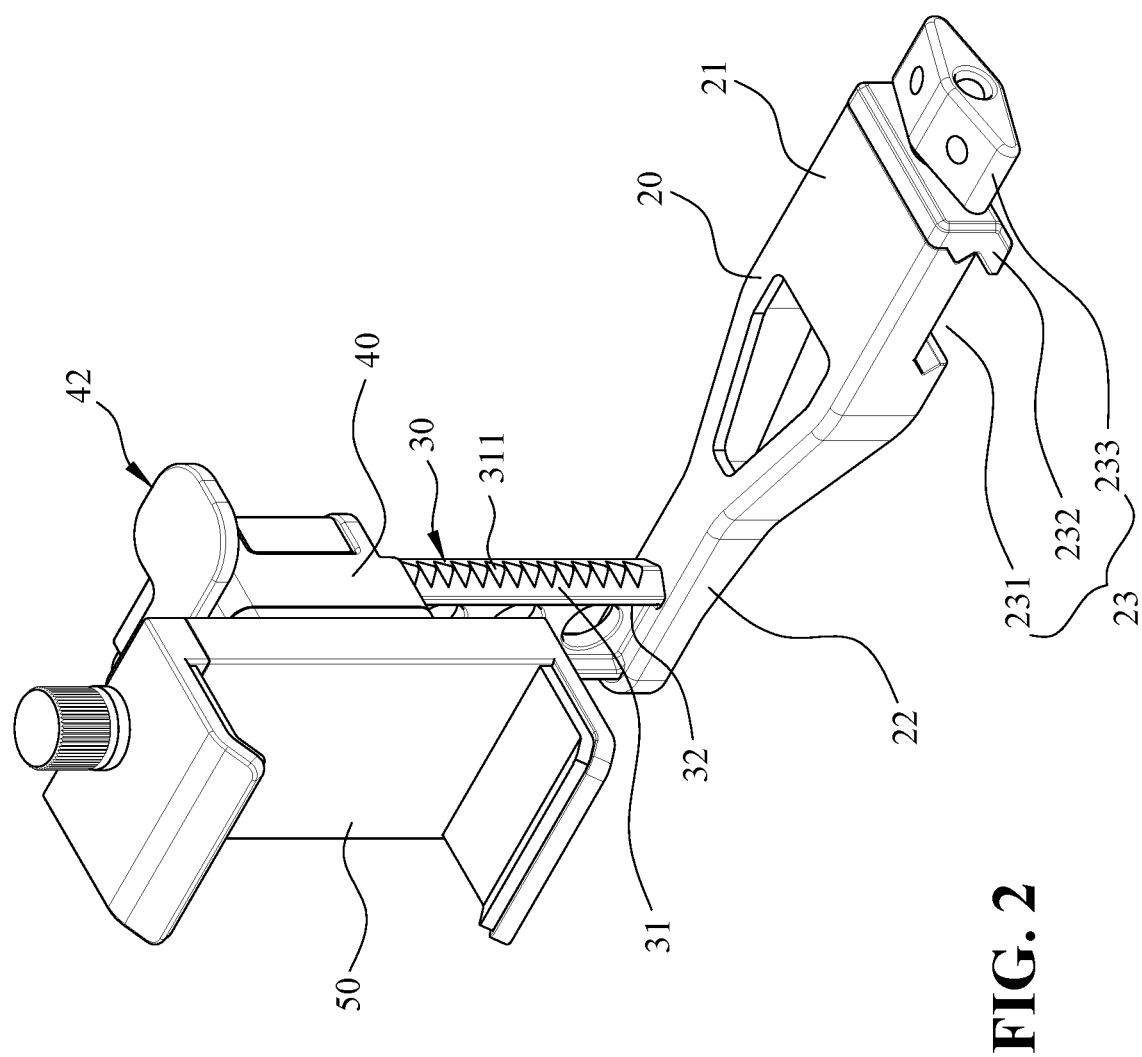
FIG. 2 is a perspective view of the mobile phone holder for guns of the present invention.
Figure 3:
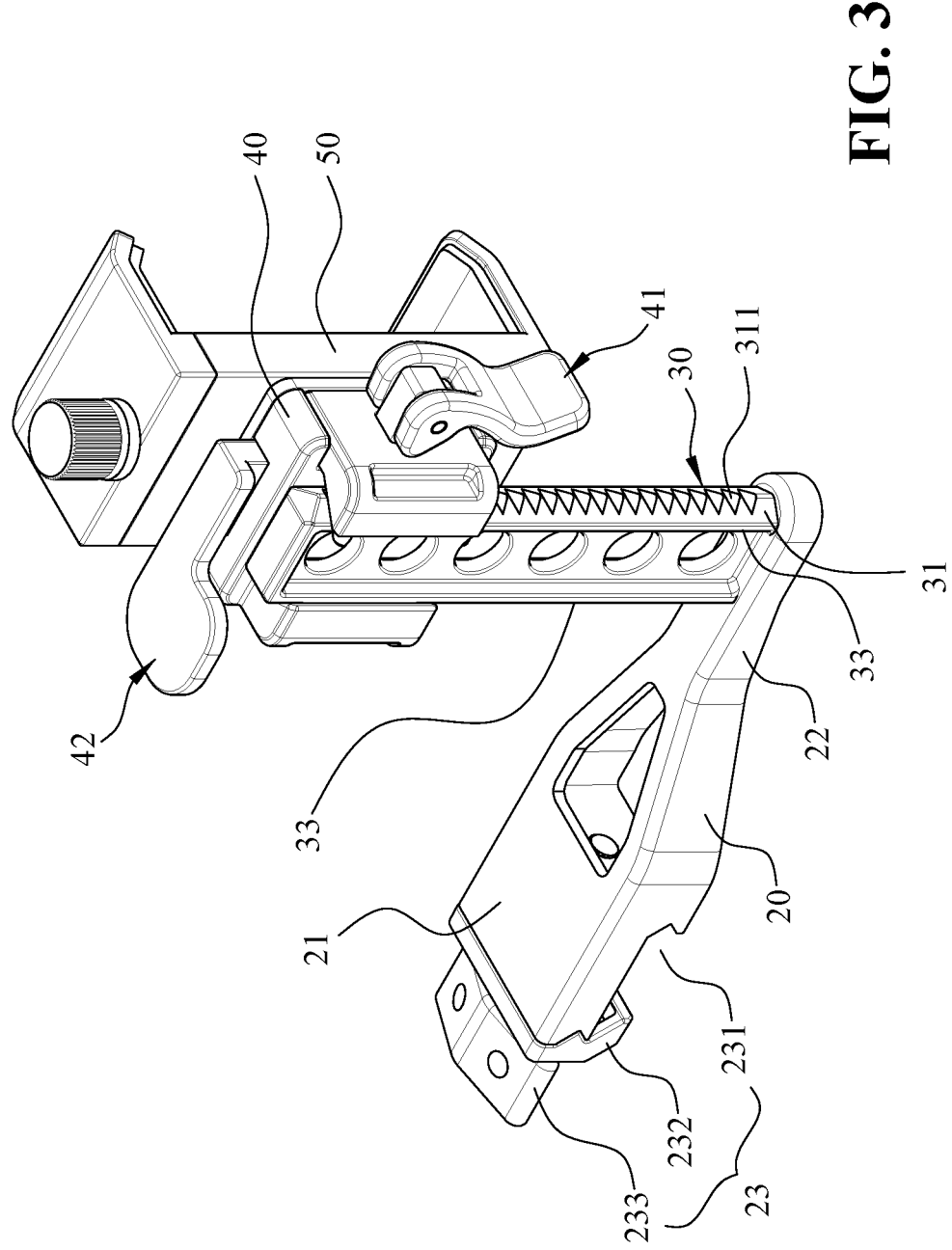
FIG. 3 is a perspective view of another angle of the mobile phone holder for guns of the present invention.

FIG. 2 and FIG. 3 show perspective views of different angles of a mobile phone holder for guns of the present invention, respectively. The mobile phone holder for guns includes a horizontal support unit 20, a vertical support unit 30, a position adjustment unit 40, and a clamping unit 50. The vertical support unit 30 stands on the horizontal support unit 20. The position adjustment unit 40 is installed on the vertical support unit 30 and can move up and down to adjust the position. To change the orientation, a user can remove the position adjustment unit 40 and re-install from top to bottom. The clamping unit 50 is mounted on the position adjustment unit 40 and is rotatable. With the mobile phone holder of the present invention, a mobile phone is clamped by the clamping unit 50, and the horizontal support unit 20 is installed at the guide rail of the gun, regardless of whether the user's dominant hand is the left or right hand, the mobile phone can be fixed to the gun.

Figure 4:
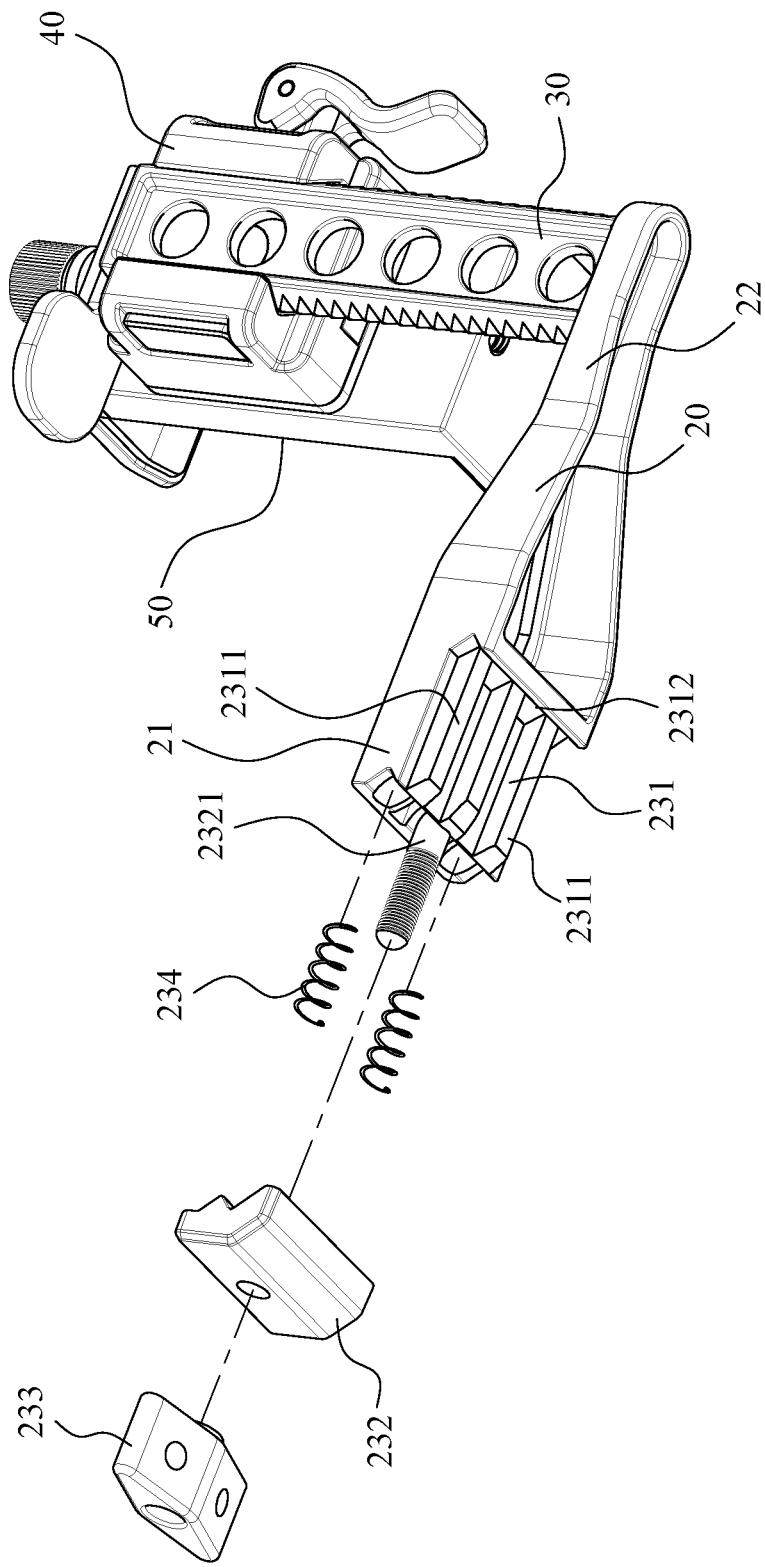
FIG. 4 is an exploded view of a locking component in the mobile phone holder for guns of the present invention.

The horizontal support unit 20 is a horizontally extending support plate, made of a metal material. In the present embodiment, the horizontal support unit 20 has a wide section 21 and a narrow section 22. The horizontal support unit 20 is provided with a locking component 23 facing downwards. The locking component 23 is used to lock onto the guide rail installed on the guns. As shown in FIG. 4, the locking component 23 includes a fitting groove 231, a clamping piece 232, and a knob 233. The fitting groove 231 has an opening facing downward and is located in the wide section 21. The fitting groove 231 has a plurality of convex strips 2311 and a clamping wall 2312. The shape of the convex strips 2311 and the clamping wall 2312 match the specifications of the guide rail. The clamping piece 232 is located on a side of the wide section 21 and can be moved closer to or further away from the fitting groove 231. In the present embodiment, a bolt 2321 is further provided to penetrate the clamping piece 232 to prevent the clamping piece 232 from separating. The knob 233 has an internal thread to match the bolt 2321. The clamping piece 232 and the fitting groove 231 form a groove shape matched with the guide rail. The knob 233 can move along the bolt 2321 through rotation to drive the clamping piece 232 to clamp. In addition, at least one first spring 234 can be added between the clamping piece 232 and the wide section 21, so that the clamping piece 232 can be automatically withdrawn when the knob 233 is loosened.

As shown in FIG. 2 and FIG. 3, the vertical support unit 30 is erected vertically on the horizontal support unit 20 on the side opposite to where the locking component 23 is located, namely, on the narrow section 22. The narrow outer wall of the vertical support unit 30 has two vertical walls 31 at opposite positions, and the vertical wall 31 has a plurality of positioning teeth 311. The wide outer wall of the vertical support unit 30 has a first mounting surface 32 and a second mounting surface 33 in opposite positions. The vertical wall 31 has an equiangular triangular cross section and is located between the first mounting surface 32 and the second mounting surface 33. In the present invention, the vertical support unit 30 has a symmetrical shape, the purpose is for the position adjustment unit 40 to be installed on one of the first mounting surface 32 or the second mounting surface 33 as required so that the mobile phone holder can be used regardless of whether the user's dominant hand is the left hand or the right hand. In FIG. 2 and FIG. 3, the mounting in performed on the first mounting surface 32.

The position adjustment unit 40 is installed on the vertical support unit 30 and can be moved up and down to adjust the position. The position adjusting unit 40 includes a first adjusting component 41 and a second adjusting component 42, the first adjusting component 41 is used to lock the position adjustment unit 40 in the adjusted position on the vertical support unit 30; the second adjusting component 42 is used to lock the position of the clamping unit 50 after rotation.

Figure 5:
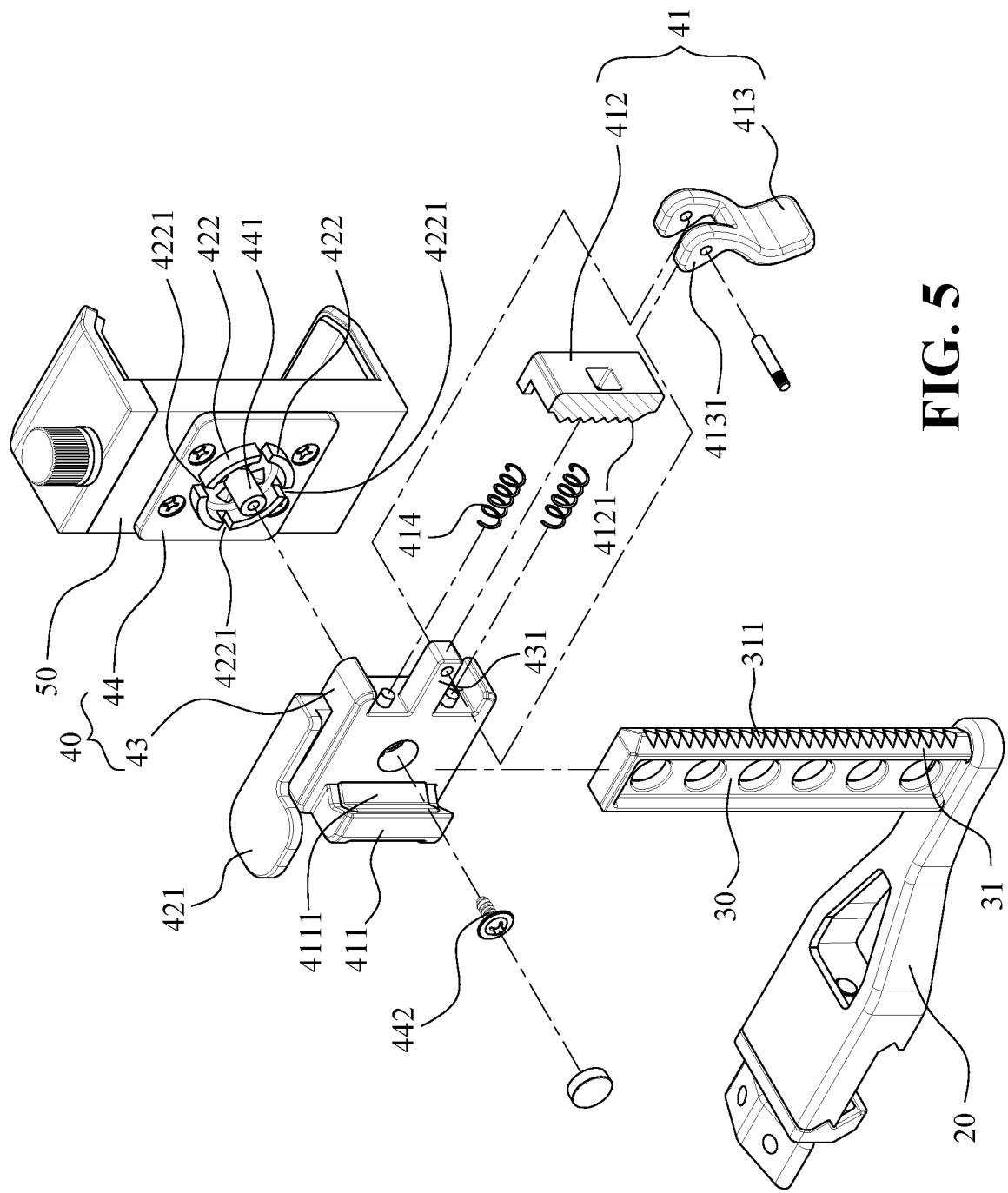
FIG. 5 is an exploded view of a first adjustment component of the position adjustment unit of the mobile phone holder for guns of the present invention.

Referring to FIG. 5, the position adjustment unit 40 further includes a housing 43 and a back plate 44. The first adjustment component 41 includes: a first clamping block 411 protruding out of the housing 43; a second clamping block 412 disposed on the housing 43 and movable; and a flip piece 413 pivotally connected to an extension post 431 of the housing 43 and in contact with the second clamping block 412 to control the moving distance of the second clamping block 412. The first clamping block 411 and the second clamping block 412 correspond to the periphery of the vertical support unit 30, wherein the inner wall of the second clamping block 412 has at least one convex tooth 4121, which can match with the positioning teeth 311. The flip piece 413 has an eccentric convex portion 4131. The convex portion 4131 is used to press against the outer wall of the second clamping block 412 after being pulled to maintain the clamping tightness. In addition, an auxiliary clip 4111 can be installed at the first clamping block 411. The auxiliary clip 4111 can be made of rubber and softer than the second clamping block 412, thereby increasing the firmness after clamping. At least one second spring 414 can be added between the second clamping block 412 and the housing 43, so that in the unlocked state, the second clamping block 412 can be automatically withdrawn from the clamping position.

Figure 6:
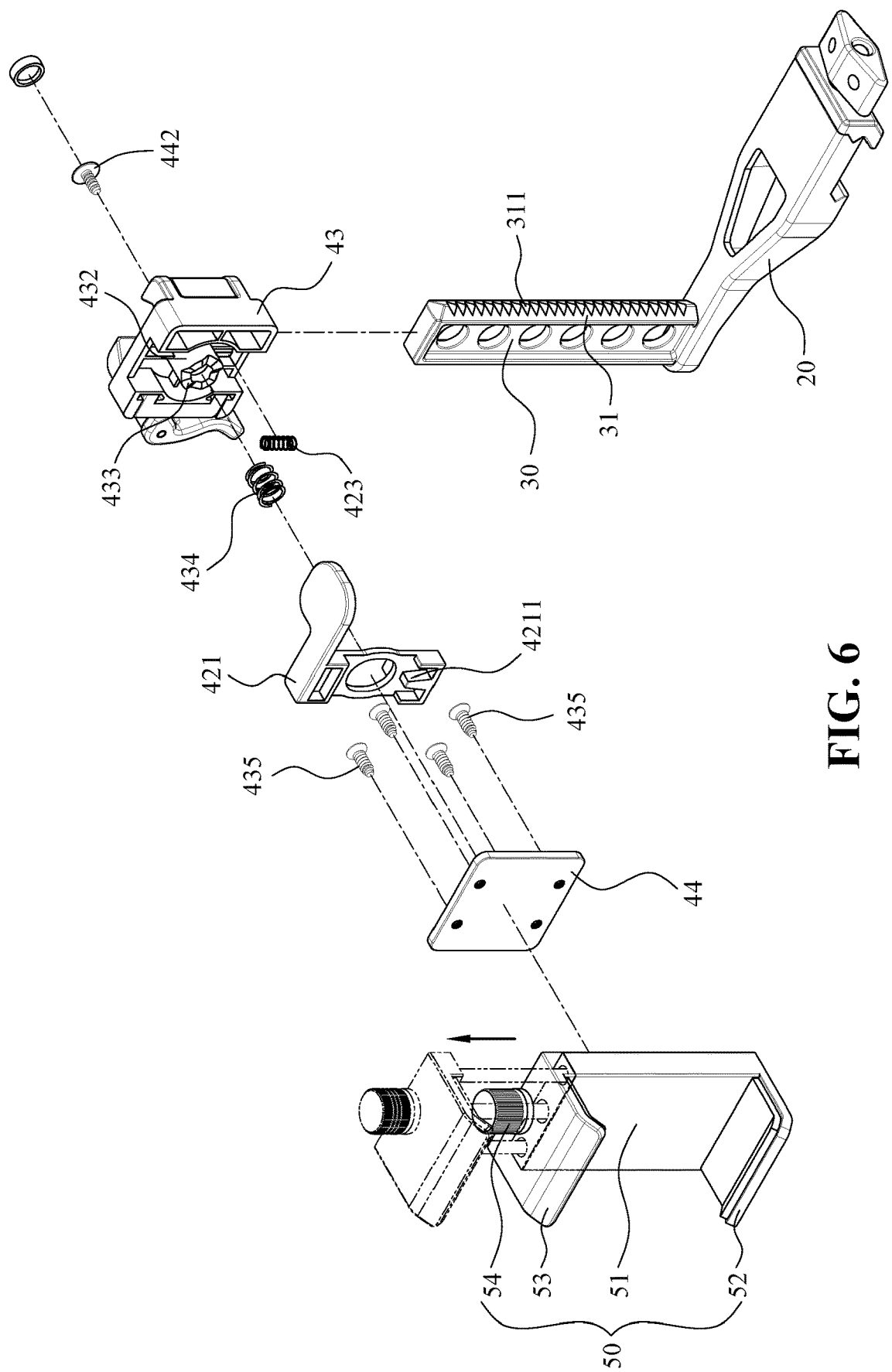
FIG. 6 is an exploded view of a second adjustment component of the position adjustment unit of the mobile phone holder for guns of the present invention.

As shown in FIG. 5 and FIG. 6, the main body of the position adjustment unit 40 is composed of the housing 43 and the back plate 44. In the present embodiment, although the back plate 44 is opposed to the housing 43, the back plate 44 can be rotated without being separated from the housing 43. In this structure, a shaft seat 432 is provided in the housing 43, and a shaft post 441 is provided at a corresponding position of the back plate 44. During assembly, the shaft post 441 is located in the shaft seat 432, and then locked to the shaft post 441 by an external screw 442. In addition, the shaft seat 432 has a tooth end surface 433, and an auxiliary spring 434 can be sleeved between the inside of the shaft seat 432 and the periphery of the shaft post 441, so that the back plate 44 can be axially moved and rotationally positioned. As such structure is similar to conventional usage, the details will not be described here. In addition, the back plate 44 is also fixed to the clamping unit 50 by a plurality of screws 435, so both the back plate 44 and the clamping unit 50 rotate synchronously.

The second adjustment component 42 of the present invention includes a press piece 421 and a positioning ring 422, the press piece 421 is partially restricted in the space formed by the assembly of the back plate 44 and the housing 43, and can be pressed up and down for a short distance movement. The press piece 421 has a latch piece 4211. The positioning ring 422 is protrudingly disposed at the back plate 44. The positioning ring 422 has a plurality of notches 4221 in different directions. When the latch piece 4211 is located in one of the notches 4221, the position of the back plate 44 is fixed. When the press piece 422 is pressed down and the latch piece 4211 is released from the notch 4221, the locked state of the back plate 44 and the housing 43 is released, and the back plate 44 and the clamping unit 50 can be rotated synchronously. As shown in FIG. 6, a restoration spring 423 is further provided in the housing 43. The restoration spring 423 provides an elastic force that can automatically restore to original position after the press piece 421 is pressed down.

The clamping unit 50 is used to clamp a mobile phone, and can be of various types, only one of which is illustrated in the figure. The clamping unit 50 includes: a carrier 51 for the back of the mobile phone to lean against; a fixed clamping arm 52 and a movable clamping arm 53, located on opposite sides of the carrier 51 and can be clamped on both sides of the mobile phone; a fixing bolt 54 penetrating the movable clamping arm 53 and to be locked on the carrier 51. In the present embodiment, the locking force of the fixed clamping arm 52 and the movable clamp arm 53 clamped on both sides of the mobile phone is controlled by the fixing bolt 54.

Figure 7:
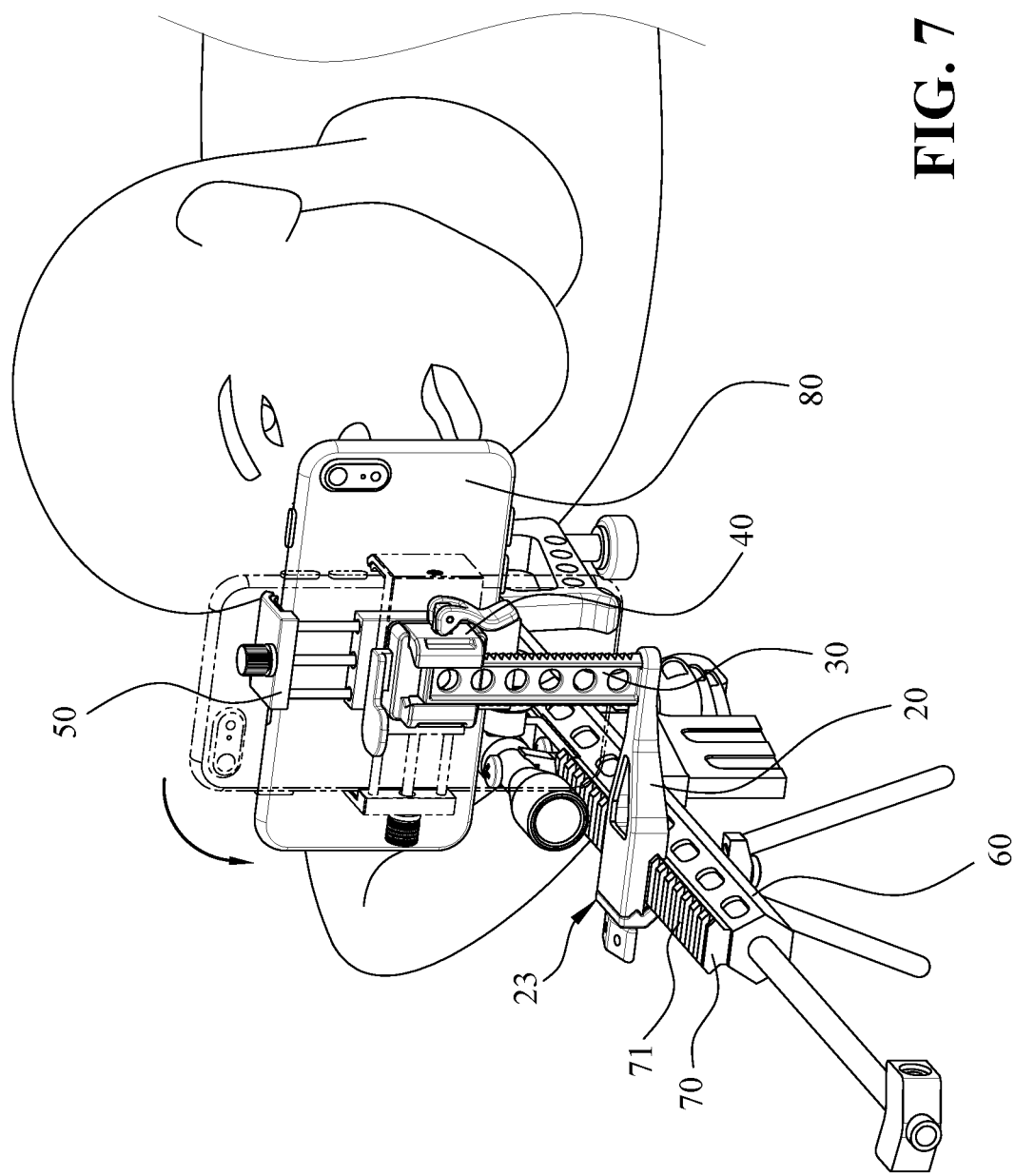
FIG. 7 is a schematic view of actual use of the mobile phone holder for guns of the present invention.

FIG. 7 shows a schematic view of actual use for the present invention. A guide rail 70 is mounted on a gun 60, and the guide rail 70 has a plurality of lateral grooves 71. In the present invention, the locking component 23 of the horizontal support unit 20 is installed and fixed at the guide rail 70 on the gun 60, and the convex strip 2311 is located in the lateral groove 71. The clamping unit 50 clamps a mobile phone 80, and the mobile phone 80 can rotate together with the clamping unit 50 as needed. The position adjustment unit 40 adjusts the height position of the vertical support unit 30 and fixes the position of the clamping unit 50 after rotation. Afterwards, the camera of the mobile phone can enlarge and display the target on the screen of the mobile phone for aiming reference, the photography function can be used to record the shooting process, or an application program can be used provide shooting assistance. In FIG. 7, the user's dominant hand is the right hand. If the dominant hand is the left hand, the horizontal support unit 20 is reversely installed on the guide rail 70, and the position adjustment unit 40 must also be removed and then installed on the other side, thereby increasing the scope of application of the present invention.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A mobile phone holder for guns, comprising:
a horizontal support unit with a locking component for locking onto a guide rail mounted on a gun;
a vertical support unit being arranged on the horizontal support unit and located on an opposite side of the horizontal support unit from where the locking component is located;
a position adjustment unit disposed on the vertical support unit at a vertically adjustable position, the position adjustment unit having a first adjustment component and a second adjustment component, the first adjustment component being used to lock the position adjustment unit in place after being moved along the vertical support unit; and
a clamping unit for clamping a mobile phone, the clamping unit being installed on the position adjustment unit and rotatable; the second adjustment component being used to lock the clamping unit in place after rotation so that the mobile phone can record or assist firing of the gun;
wherein the vertical support unit comprises two oppositely positioned vertical walls, each of the vertical walls has a plurality of positioning teeth, the position adjustment unit comprises a housing and a back plate, the first adjustment component comprises a first clamping block protruding out of the housing, a second clamping block provided with the housing and a flip piece pivotally connected to an extension post of the housing and contacting the second clamping block, the flip piece controls movement of the second clamping block, the first clamping block and the second clamping block can be clamped respectively on one of the vertical walls, and an inner wall of the second clamping block has convex teeth matched with the positioning teeth.

2. The mobile phone holder for guns according to claim 1, wherein the locking component comprises: a fitting groove located on a bottom surface of the horizontal support unit, the fitting groove having a plurality of convex strips and a clamping wall; a clamping piece located on the horizontal support unit at a position corresponding to the fitting groove and able to move horizontally; and a knob used to lock the clamping piece to the horizontal support unit.

3. The mobile phone holder for guns according to claim 2, wherein the guide rail comprises a plurality of lateral grooves, the fitting groove and the clamping piece can be clamped on the guide rail, and the convex strips are located in the lateral grooves.

4. The mobile phone holder for guns according to claim 1, wherein the vertical support unit comprises a first mounting surface and a second mounting surface positioned in opposite directions, and the position adjustment unit is mounted on one of the first mounting surface and the second mounting surface.

5. The mobile phone holder for guns according to claim 1, wherein an auxiliary clip is installed on the first clamping block, and a hardness of the auxiliary clip is softer than that of the second clamping block.

6. The mobile phone holder for guns according to claim 1, wherein the back plate is mounted on the housing and is rotatable but unable to be disengaged from the housing, the back plate is locked with the clamping unit in a locked state of the back plate and the housing; the second adjustment component has a press piece, the locked state of the back plate and the housing is released when the press piece is pressed down, and the clamping unit and the back plate can be rotated synchronously.

7. The mobile phone holder for guns according to claim 6, wherein the second adjustment component further comprises a positioning ring, protrudingly disposed at the back plate and having a plurality of notches in different directions, the press piece is positioned in a space formed by the back plate and the housing, the press piece can move a distance after being pressed and can automatically return to an original position when there is no external force; the press piece has a latch piece, the back plate cannot be rotated when the latch piece is in one of the notches; and when the press piece is pressed down and the latch piece is released from said one of the notches, the locked state of the back plate and the housing is released, and the clamping unit and the back plate can be rotated.

* * * * *